United States Patent
Dunn

(10) Patent No.: US 8,810,972 B1
(45) Date of Patent: Aug. 19, 2014

(54) ELECTRICAL INTERCONNECT FROM DISK DRIVE SUSPENSION FLEXURE TO PZT MOTOR

(71) Applicant: Magnecomp Corporation, Murrieta, CA (US)

(72) Inventor: Christopher G. Dunn, Austin, TX (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 14/102,123

(22) Filed: Dec. 10, 2013

Related U.S. Application Data

(60) Provisional application No. 61/736,971, filed on Dec. 13, 2012.

(51) Int. Cl.
  G11B 5/56 (2006.01)
  G11B 21/24 (2006.01)
  G11B 5/48 (2006.01)
(52) U.S. Cl.
  CPC .................................. G11B 5/48 (2013.01)
  USPC ........................................ 360/294.4

(58) Field of Classification Search
  USPC ........... 360/244.1, 245.8, 245.9, 294.3, 294.4
  See application file for complete search history.

(56) References Cited

U.S. PATENT DOCUMENTS

| | | | |
|---|---|---|---|
| 7,205,484 | B2 | 4/2007 | Shiraishi et al. |
| 7,781,679 | B1 | 8/2010 | Schreiber et al. |
| 8,395,866 | B1 | 3/2013 | Schreiber et al. |
| 8,553,364 | B1 | 10/2013 | Schreiber et al. |
| 2011/0279929 | A1 | 11/2011 | Kin |

*Primary Examiner* — Joseph Feild
*Assistant Examiner* — Gustavo Polo
(74) *Attorney, Agent, or Firm* — Intellectual Property Law Offices of Joel Voelzke, APC

(57) ABSTRACT

An electrical interconnect from a suspension electrical circuit to a PZT microactuator motor includes copper plated onto a first side of a stainless steel support layer and gold plated onto a second and opposite side of the stainless steel support layer, with the gold plated stainless steel surface bonded to the PZT motor surface by conductive epoxy. The stainless steel may have a via etched into it to the copper surface before the gold plating step which then plates both the stainless steel and the copper with gold, so that the conductive epoxy is in physical and electrical contact with both the gold plated stainless steel and thus in electrical contact with the copper, and also in direct physical and electrical contact with the gold plated copper.

20 Claims, 6 Drawing Sheets

ELECTRICAL INTERCONNECT FROM DISK DRIVE SUSPENSION FLEXURE TO PZT MOTOR

CROSS-REFERENCE TO RELATED APPLICATIONS

This application claims benefit of U.S. Provisional Patent Application No. 61/736,971 filed Dec. 13, 2012.

BACKGROUND OF THE INVENTION

1. Field of the Invention

This invention relates to the field of suspensions for hard disk drives. More particularly, this invention relates to the field of electrical interconnects from disk drive suspension flexures to PZT microactuator motors.

2. Description of Related Art

Magnetic hard disk drives and other types of spinning media drives such as optical disk drives are well known. FIG. 1 is an oblique view of an exemplary prior art hard disk drive and suspension for which the present invention is applicable. The prior art disk drive unit 100 includes a spinning magnetic disk 101 containing a pattern of magnetic ones and zeroes on it that constitutes the data stored on the disk drive. The magnetic disk is driven by a drive motor (not shown). Disk drive unit 100 further includes a disk drive suspension 105 to which a magnetic head slider (not shown) is mounted proximate a distal end of load beam 107. The "proximal" end of a suspension or load beam is the end that is supported, i.e., the end nearest to base plate 12 which is swaged or otherwise mounted to an actuator arm. The "distal" end of a suspension or load beam is the end that is opposite the proximal end, i.e., the "distal" end is the cantilevered end.

Suspension 105 is coupled to an actuator arm 103, which in turn is coupled to a voice coil motor 112 that moves the suspension 105 arcuately in order to position the head slider over the correct data track on data disk 101. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only voice coil motor 112 moves suspension 105.

In a DSA suspension, as for example in U.S. Pat. No. 7,459,835 issued to Mei et al. as well as many others, in addition to voice coil motor 112 which moves the entire suspension, at least one microactuator is located on the suspension in order to effect fine movements of the magnetic head slider to keep it properly aligned over the data track on the spinning disk. The microactuator(s) provide much finer control and much higher bandwidth of the servo control loop than does the voice coil motor alone, which effects relatively coarse movements of the suspension and hence the magnetic head slider. A piezoelectric element, sometimes referred to simply as a PZT, is often used as the microactuator motor, although other types of microactuator motors are possible. In the discussion that follows, for simplicity the microactuator maybe be referred to simply as a "PZT," although it will be understood that the microactuator need not be of the PZT type.

FIG. 2 is a top plan view of the prior art suspension 105 in FIG. 1. Two PZT microactuators 14 are affixed to suspension 105 on microactuator mounting shelves 18 that are formed within base plate 12, such that the PZTs span respective gaps in base plate 12. Microactuators 14 are affixed to mounting shelves 18 by non-conductive epoxy 16 at each end of the microactuators. The positive and negative electrical connections can be made from the PZTs to the suspension's flexible wiring trace and/or to the grounded base plate by a variety of techniques.

The suspension includes both a load beam which is formed of stainless steel, and a flexure that includes the electrical circuit. The electrical circuit typically comprises a stainless steel support layer, an insulator such as polyimide thereon, copper signal traces thereon, and an insulating and protective cover layer such as polyimide thereon.

FIG. 3 is a top perspective closeup view of suspension of FIG. 2 in the area of one of the PZT microactuators 14. Electrical interconnect contact pad 22 on the underside of PZT 14 as viewed in FIG. 3, which defines the electrical interconnection to one surface electrode of PZT 14, is shown in hidden lines.

FIG. 4A-4F are a process flow diagrams illustrating the process for forming a suspension flexure or circuit or electrical interconnect contact pad 22 or a flying lead, and attaching it to a PZT motor 170, according to the prior art. The process begins with a sheet of stainless steel 110 on which a layer of insulating material 120 such as polyimide is coated. A layer of conductive material 130 such as copper or copper alloy is then deposited on the polyimide 120. Typically, before copper layer 130 is deposited, a thin layer of chromium is deposited on the polyimide by sputtering, followed by a thin layer of copper deposited by sputtering, which ensures that the electrodeposited layer of copper 130 will adhere to the polyimide. The stainless steel 110 and polyimide 120 are then patterned and etched away from the copper pad 132 to form the flying lead or contact pad 22.

FIG. 4F is a side sectional view of shows could be either an electrical interconnect flying lead or a contact pad 22 as shown in FIG. 3 with the contact pad 22 having a central copper contact 132 with stainless steel 110 and polyimide 120 formed in a generally circular pattern around the central copper contact 132. A flying lead is defined by an exposed contact of the conductive layer in a circuit for making electrical contact to a component, with the circuit continuing both to the left and right thereof and being at least capable of having electrical components attached to the lead on one or both sides of the exposed pad 132 of conductive material. In other configurations, the exposed copper pad 132 constitutes a terminus, there being stainless steel 110 and polyimide 120 on only one horizontal side thereof. The unsupported copper pad 132, whether it be a flying lead or circular contact pad 22 as shown in FIG. 4 or a terminus as shown in FIG. 3, is then typically plated with a protective plating such as nickel 138 on the exposed surfaces of copper, followed by a finish plating such as gold 150, 152. The combined nickel and gold layers will be referred to simply as the Ni/Au plating or layer. During suspension assembly a conductive epoxy 140 is applied between the copper pad 132 and the PZT motor 170 which includes PZT material 172 and metallized first and second sides 174, 175. Conductive epoxy 140 is then thermally cured to make a mechanical/electrical connection between the flexure and the PZT motor 170. Typically, the conductive epoxy 140 from the PZT surface to the copper pad surface is approximately 20-40 µm thick.

SUMMARY OF THE INVENTION

The present invention is of an improved interconnect structure from the electrical circuit of the flexure to an electrical component such as a PZT motor, and the process for making that structure.

In a first embodiment, the process flow for which is shown in FIG. 5, when the electrical circuit is formed in the area that will become the contact pad, an insulating layer such as polyimide is patterned on the stainless steel and etched before the copper is electroplated. The result is that the copper is electroplated through an aperture in the polyimide and directly onto the top surface of the stainless steel, optionally with an intermediate layer such as gold deposited onto the stainless steel before the copper is electrodeposited thereon. The bottom surface of the stainless steel is then preferably coated with gold. The gold-coated stainless steel is then affixed to the PZT surface using conductive epoxy. The result is that the layer of conductive epoxy from the PZT surface to a low resistance portion of the contact pad area is much thinner, typically less than 5 μm thick, than in the prior art. Because conductive epoxy requires electrical connections between multiple vertically stacked conductive particles interspersed within the epoxy, the greater the vertical thickness of the conductive epoxy, the greater the electrical resistance. The prior art conductive epoxy thickness of about 20-40 μm meant that the electrical path traversed approximately 15-20 conductive particles. Because the conductive epoxy according to the invention can be less than about 5 μm thick, the electrical path traverses only approximately 2-4 conductive particles. By reducing the thickness of the conductive epoxy, the present invention significantly reduces the electrical resistance between the flexure electrical contact pad and the PZT motor, which in turn increases the stroke length of the PZT motor.

In a second embodiment, the process flow for which is shown in FIG. 6, after the polyimide has been patterned and etched to create an aperture therethrough, and the copper electroplated into the aperture and onto the top surface of the stainless steel, the stainless steel is etched away to reveal the copper contact pad, and the stainless steel and the exposed copper are then plated with gold. The contact pad including both the gold-plated stainless steel and the gold-plated copper are then affixed to the PZT motor using conductive epoxy. In this embodiment, the gap from the PZT surface to the copper which must be filled with conductive epoxy is reduced over the prior art by a length that is equal to the polyimide layer thickness. Some reduction in electrical resistance of the interconnect is achieved thereby over the prior art. Furthermore, the narrowest gap between the PZT surface and the nearest low resistance portion of the contact pad area, which is gold-plated stainless steel, is in the range of about less than 5 μm. This is significantly less than the thickness of the conductive epoxy according to the prior art. Accordingly, the overall resistance of the interconnect is significant reduced over the prior art. The process of the present invention therefore results in an improved electrical connection between the flexure and the PZT motor.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
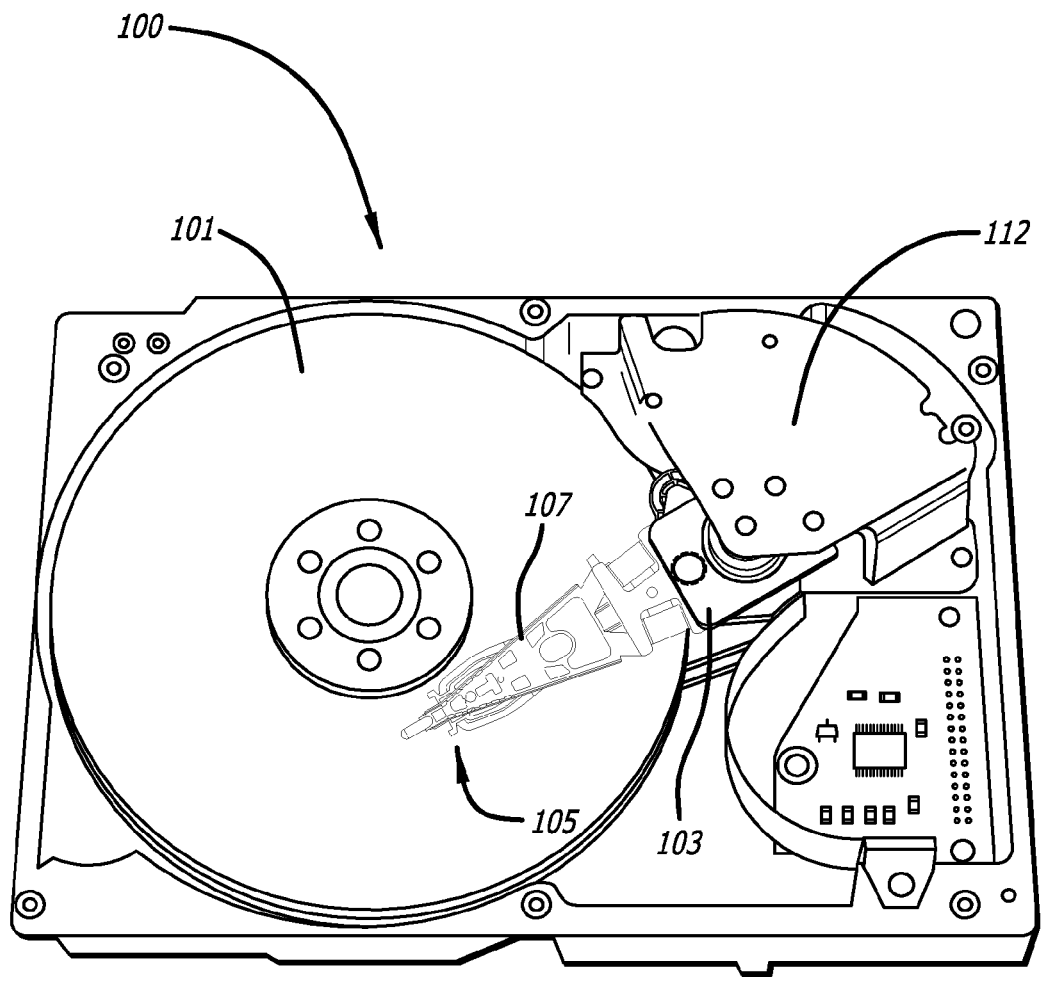
FIG. 1 is a top perspective view of a prior art magnetic hard disk drive.
Figure 2:
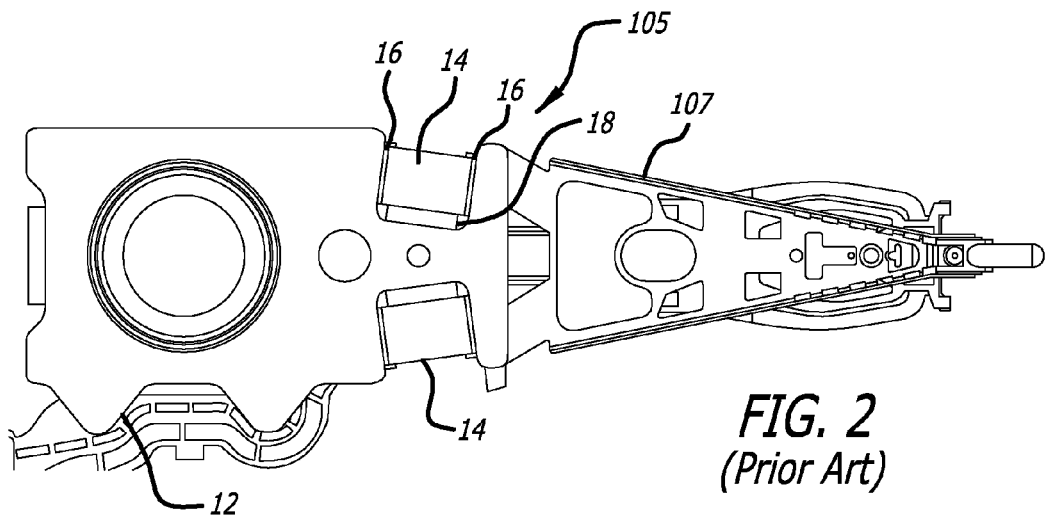
FIG. 2 is a top plan view of the suspension of the disk drive of FIG. 1.
Figure 3:
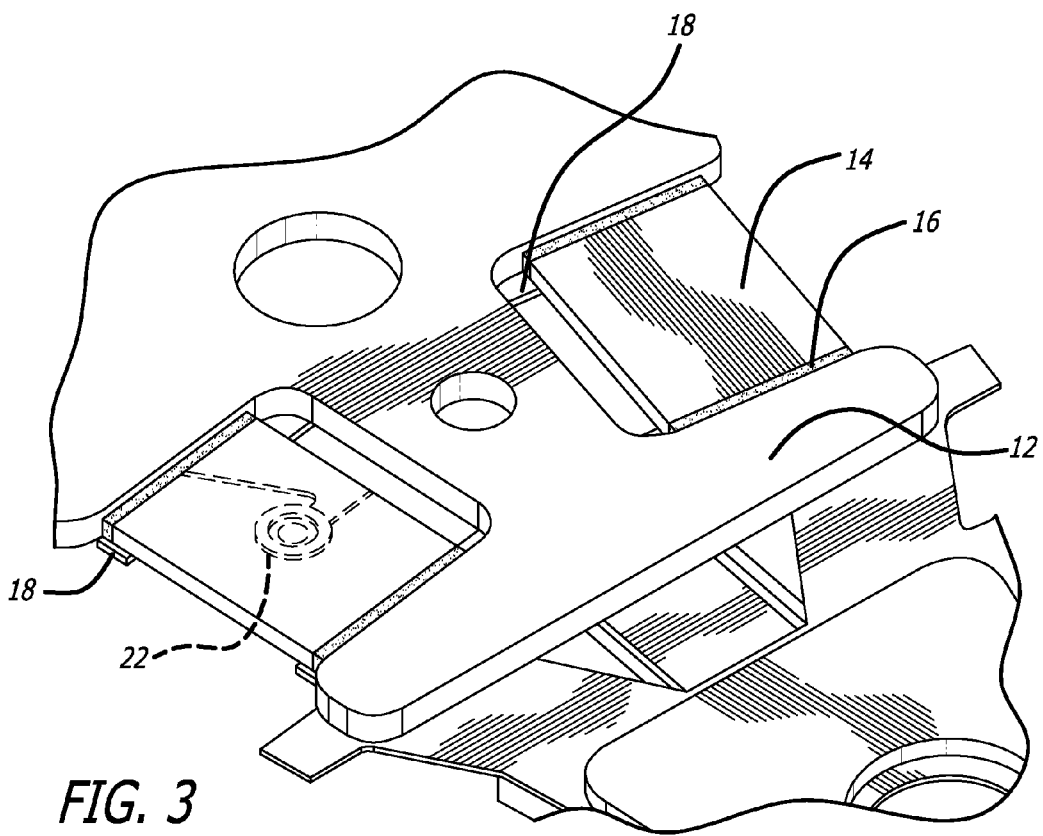
FIG. 3 is a top perspective closeup view of suspension of FIG. 2 in the area of one of the PZT microactuators.
Figure 4A:
FIG. 4A-4F constitute a process flow diagram illustrating the process for forming a suspension flexure circuit copper flying lead or contact pad and attaching it to a PZT motor according to the prior art.
Figure 4B:
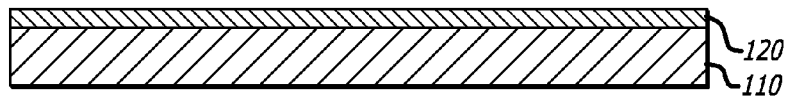
Figure 4C:
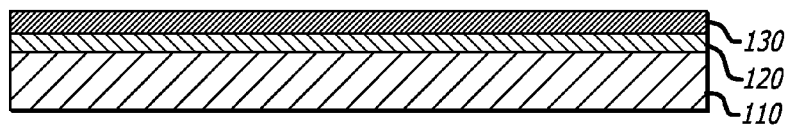
Figure 4D:
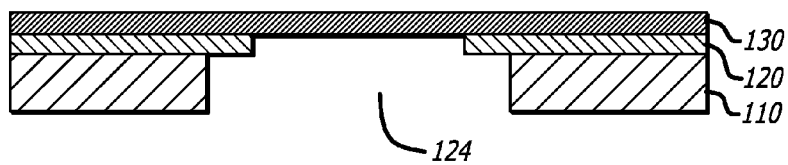
Figure 4E:
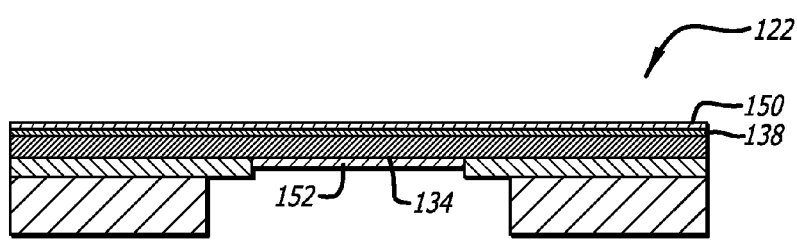
Figure 4F:
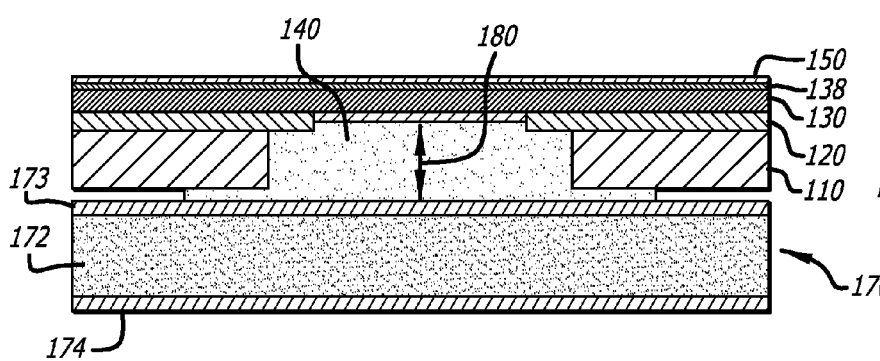

FIGS. 5A-5E constitute is a process flow diagram illustrating the process for forming a suspension flexure circuit electrical interconnect contact pad 222, and attaching it to a PZT motor 170 or other electrical component, according to a first embodiment of the invention. In the process, a rivet or barrel interconnect is made between copper layer 130 and the stainless steel support layer 110. This feature is made on the flexure by first patterning the insulative layer 120 such as polyimide layer after polyimide coating to leaving an opening or aperture 126 in the polyimide 120 where the interconnect will be located on the flexure. When the copper conductive layer 130 is then applied to the flexure it defines a copper via 135 between the stainless steel support layer 110 and copper layer 130 at the location of the interconnect. The flexure circuit then can be Ni/Au plated on the copper 130 and the stainless steel layer 110 at the interconnect location to make a low resistance bondable surface. The gold 150, 152 serves as a protective layer to prevent oxidation and corrosion of both the stainless steel 110 and the copper 130. At the suspension assembly step a conductive adhesive such as conductive epoxy 140 can be used to directly and physically bond the gold plated stainless steel 110 surface to the PZT 170. Vertical Line L5 extends through conductive layer layer 130 and optional Ni/Au plating layer 150, through stainless steel layer 110 and optional gold layer 152, through conductive adhesive 140, and through microactuator motor 170, without extending through insulative layer 120.

This improved via construction provides the following advantages. First, it provides a solid metal via for a low resistance and high reliability interconnect between the copper and stainless steel layer. Second, it reduces the electrical gap 280 between the flexure and PZT that the conductive epoxy must fill to less than about 5 μm. The reduced gap improves reliability by reducing the number of silver particles electrically connecting the PZT to the flexure from 15-20 or more particle connections to 2-4 particle connections in the Z axis. Conductive epoxy depends on surface contact of silver particles to make electrical connection through the conductive epoxy. The greater the number of surface contacts made through the conductive epoxy in the Z axis, the higher the resulting resistance of the conductive epoxy in the Z axis. Lowering the number of particles needed to make electrical contact lowers the overall resistance of the conductive epoxy fill material.

Figure 6A:
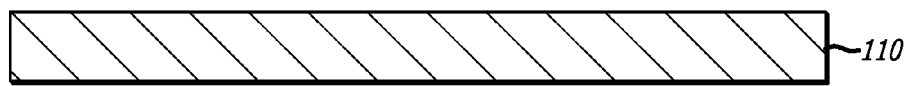
FIG. 6A-6F constitute a process flow diagram illustrating the process for forming a suspension flexure circuit contact pad and attaching it to a PZT motor according to a second embodiment of the present invention.
Figure 6B:
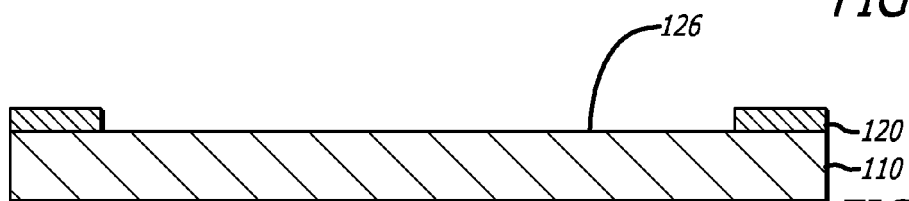
Figure 6C:
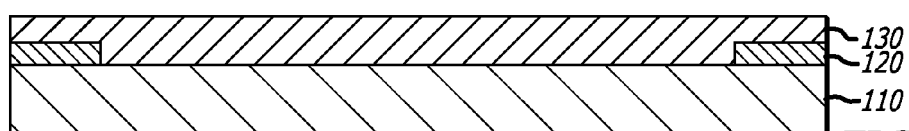

FIG. 6A-6E constitute a process flow diagram illustrating the process for forming a suspension flexure circuit electrical interconnect contact pad 322, and attaching it to a PZT motor 170 or other electrical component, according to a second embodiment of the invention. As shown in FIG. 6B, polyimide 120 is selectively coated, or selectively removed, to leave an opening or aperture 126 in the polyimide. Copper 130 is then plated onto the stainless steel 110. The bottom surface 134 of copper layer 130 thus abuts up against the top surface 113 of stainless steel support layer 110, i.e., the bottom surface 134 of copper layer 130 is coplanar with the top surface 113 of stainless steel support layer 110. The stainless steel 110 is then etched to form an aperture 114 or other opening in the stainless steel that exposes the bottom surface 134 of the copper and walls 111 of stainless steel support layer 110.

Figure 6D:
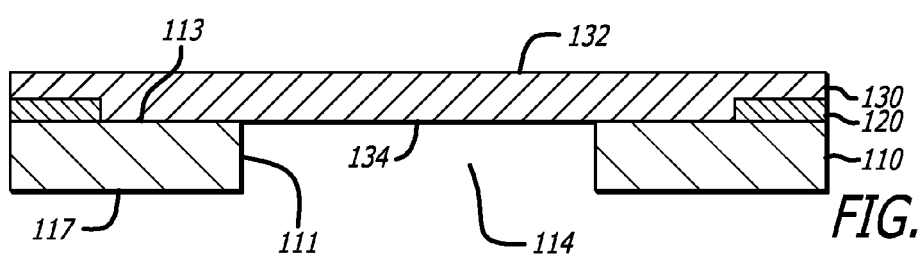
Figure 6E:
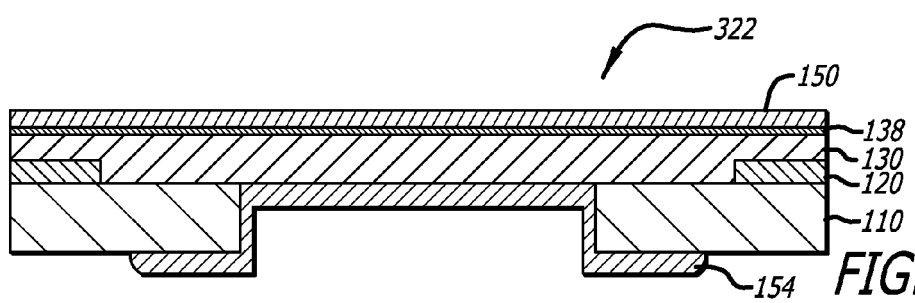

As used herein, the term "opening" in the stainless steel means that there is an area of no stainless steel on the same horizontal level as an adjacent area having stainless steel. As such, an opening in the stainless steel may be either an open ended opening such as a terminus of the stainless steel, or a closed ended opening such as an aperture which has stainless steel material on either side of the aperture as shown in FIG. 6D.

Nickel and gold 150, 154 plating are then performed to make a continuously gold plated surface 154 on the back side of the copper pad 132, on the exposed walls 111 of the stainless steel 110, and on a portion of bottom surface of stainless steel 110 for conductive epoxy 140 bonding.

This option creates a pocket for allowing the conductive epoxy 140 to be held but still provides the small electrical gap 380 to improve reliability of conductive epoxy 140. Conductive epoxy 140 thus defines a conductive path from PZT 170 to copper contact surface 134 through via 114 in stainless steel layer 110. Conductive adhesive 140 extends through via 114 in stainless steel layer 110 but does not extend through a via in the insulative layer 120. This structure results in a smaller gap 380 of conductive epoxy 140 from the PZT 170 surface to the nearest low resistance metal surface of the contact pad 322, which in this case is gold plated layer 154 on stainless steel 110 to which copper 130 is plated, and thus results in a lower electrical resistance for the interconnect than in the prior art. Additionally, the thickest portion of the conductive epoxy 140 from the PZT 170 surface to the copper bottom surface 134 is still thinner than in the prior art interconnect, due to the fact that the epoxy 140 no longer spans the thickness of both the stainless steel layer 110 and the polyimide layer 120 as in the prior art before reaching the copper 130. Vertical Line L6 extends through conductive layer 130 and optional Ni/Au plating layer 150, through stainless steel layer 110 and optional gold layer 154, through conductive adhesive 140, and through microactuator motor 170, without extending through insulative layer 120. Conductive adhesive 140 directly and physically bonds microactuator motor 170 to both the stainless steel layer 110 and its protective gold layer 154 and also to copper conducive layer 130 including any protective layer thereon such as nickel and/or gold.

As seen in FIG. 6, gap 114 through stainless steel support layer 110 filled with conductive adhesive 140 such as conductive epoxy defines a via through the stainless steel. This structure therefore includes both a first aperture or via 126 through the polyimide 120 or other insulative layer and filled with copper deposited therein, and a second aperture or via 114 through the stainless steel 110, with copper 130 extending through the first via 126 and conductive epoxy 140 extending through the second via 114 to meet where those two vias meet. The copper and conductive epoxy meet at a vertical level that is the same vertical level where the stainless steel 110 nominally meets polyimide 120 adjacent to but outside vias 126, 114. In the embodiment as shown, via 114 through the stainless steel is narrower than via 126 through the polyimide. Adjacent to and horizontally spaced apart from the via 114 which extends through stainless steel 110, some of the copper 130 is deposited on the stainless steel 110 without any polyimide 120 therebetween. As used herein, to say that copper 130 and conductive epoxy 140 "meet" and at a specific vertical level, does not preclude the existence of thin layers such as nickel and/or gold 154 on the copper 130 for purposes such as improving adhesion and/or providing protection against corrosion.

Figure 5A:
FIGS. 5A-5E constitute a process flow diagram illustrating the process for forming a suspension flexure circuit contact pad and attaching it to a PZT motor according to a first embodiment of the present invention.
Figure 5B:
Figure 5C:
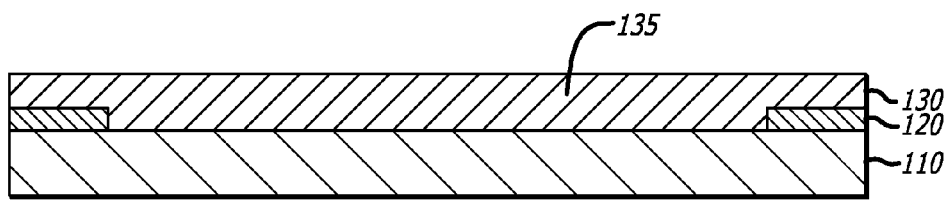
Figure 5D:
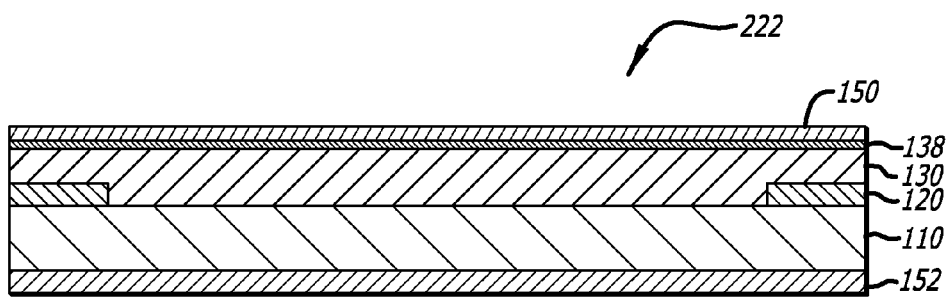
Figure 5E:
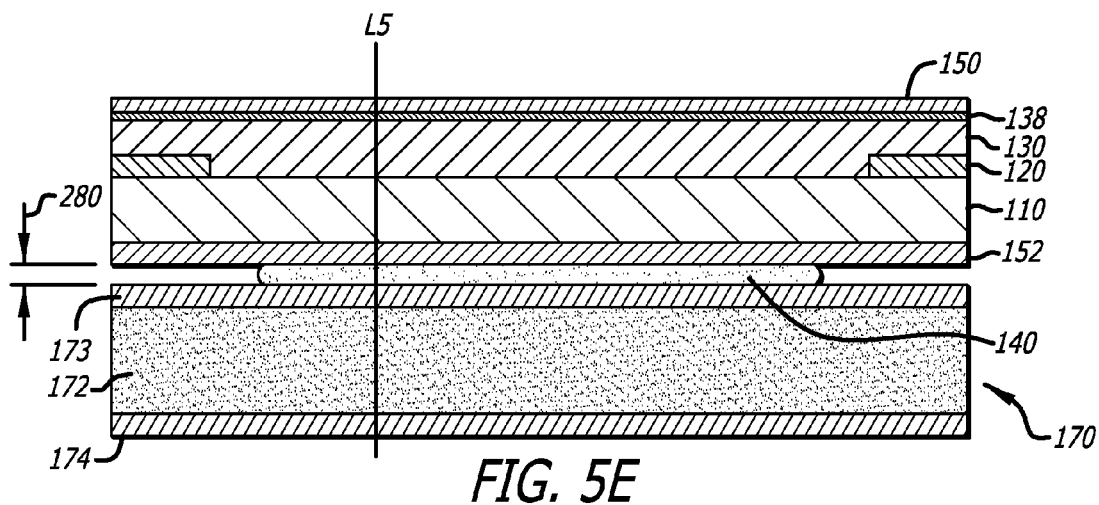
Figure 6F:
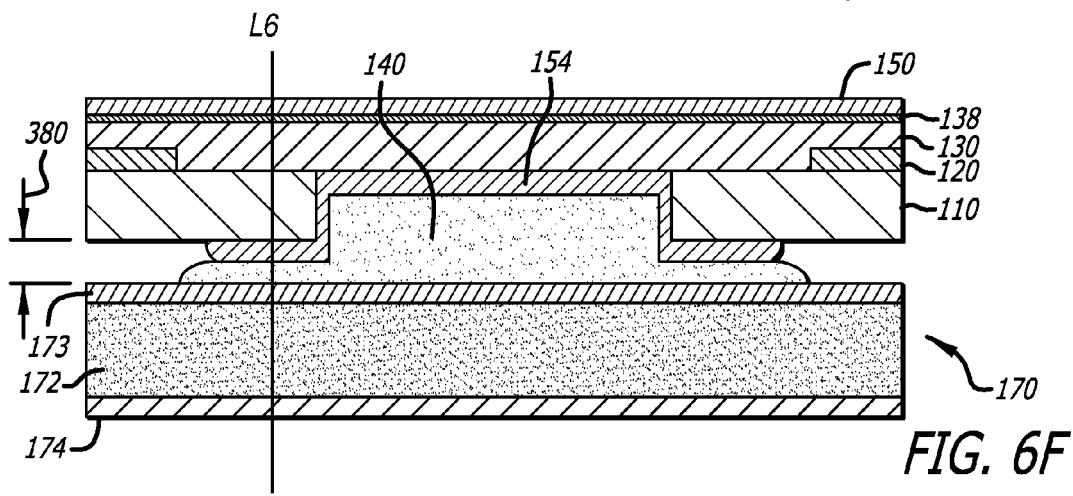
Figure 7:
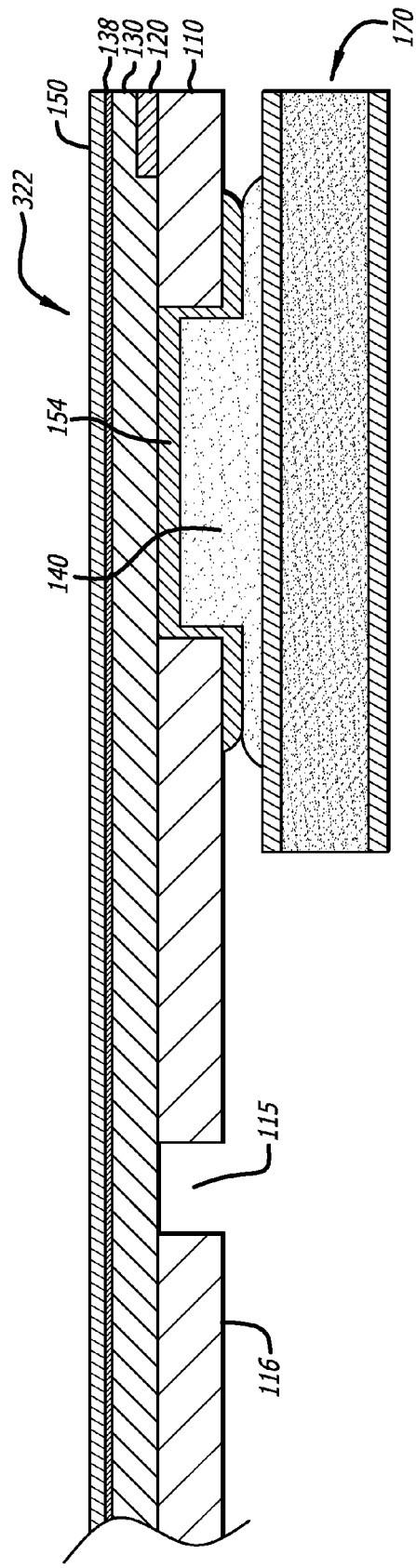
FIG. 7 is a cross sectional view of a flexure circuit contact pad and its interconnect showing additional details that could apply to the contact pads of either FIG. 5E or FIG. 6F.

FIG. 7 is a cross sectional view of a flexure circuit contact pad and its interconnect showing additional details that could apply to the contact pads of either FIG. 5E or FIG. 6F. In this illustrative embodiment, the electrical circuit terminates at bonding pad or contact pad 322, and stainless steel support layer 110 is electrically isolated by gap 115 in the stainless steel, the gap electrically isolating stainless steel support layer 110 from the remainder of stainless steel support layer 116. The stainless steel support layer of a flexure circuit is normally grounded, so gap 115 prevents a microactuator driving voltage carried on conductive layer 150 from shorting out. Alternatively, contact pad 322 could be a ground contact pad, in which case gap 115 could be eliminated so that the top surface of the PZT is grounded through the stainless steel layers 110 and/or through conductive layer 150. FIG. 7 as shown includes the contact pad 222 of FIG. 5E. The figure including gap 115 in the stainless steel layer is equally applicable to contact pad 222 of FIG. 5E or contact pad 322 of FIG. 6F, and to a flying lead in the middle of a circuit instead of a contact pad at the terminus of a circuit. Thus, in either or both of FIGS. 5E and 6F, stainless steel support layer 110 may be either grounded or isolated from ground, and conductive layer 130 could be either grounded or could carry a microactuator driving voltage.

In the foregoing description, for simplicity and clarity of discussion certain plating steps have been omitted that will be obvious to those skilled in the art. For example, copper is typically not plated onto polyimide without first preparing the polyimide surface. Typically, the polyimide is prepared to receive a copper plating such as by first sputtering a seed layer of chromium onto the polyimide followed by sputtering a layer of copper onto the chromium. Similarly, stainless steel may be prepared for copper plating by first depositing nickel, such as by electroplated or electroless plated nickel, onto the stainless steel material. Furthermore, the stainless steel surface may be prepared before any plating is performed on it, by activating it in an activating acid solution. Such technique are taught or referenced in, for example, U.S. Pat. Nos. 8,320, 083; 8,189,301; and 7,829,793, all of which are assigned to the assignee of the present invention, and all of which are incorporated by reference as if fully set forth herein for their teachings of suspension circuit plating processes. Similarly, other well known techniques may be used to facilitate plating copper onto the stainless steel, and to facilitate gold plating onto the copper and the stainless steel. For purposes of the specification and appended claims, one material will be referred to as directly deposited or plated onto a second material and in direct physical and electrical contact with the second material, even though the second material may have been prepared by depositing one or more very thin layers such as but not strictly limited to less than 1 µm thick layers of materials such as chromium, nickel, and/or gold for purposes of allowing the first material to sufficiently adhere to the second material and/or for protecting the second material from corrosion.

Similarly, the surfaces (electrodes) of the PZT microactuators are typically metallized using various well known techniques, including gold plating, before contact pads are adhered thereto. For purposes of the specification and appended claims, the electrical circuits including the copper and/or stainless steel thereof will be referred to as being bonded directly to the PZT surfaces using conductive adhesive, even though the PZT surfaces have metallization, gold, or some other conductive material thereon.

It will be understood that the terms "generally," "approximately," "about," "substantially," and "coplanar" as used within the specification and the claims herein allow for a certain amount of variation from any exact dimensions, measurements, and arrangements, that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, Accordingly, it is to be understood that the detailed description and the accompanying drawings as set forth hereinabove are not intended to limit the breadth of the present invention, which should be inferred only from the following claims and their appropriately construed legal equivalents.

I claim:

1. A dual stage actuated suspension having an electrical interconnect contact pad bonded to a microactuator motor, the electrical interconnect contact pad and its bonding comprising:
   a stainless steel support layer;
   an insulative layer on a first portion of the stainless steel and not on a second portion of the stainless steel;
   a copper layer deposited on the insulative layer on the first portion of the stainless steel, and directly deposited on the second portion of the stainless steel;
   a protective layer on the stainless steel; and
   a conductive adhesive bonding the protective layer on the stainless steel directly to the microactuator motor.

2. The dual stage actuated suspension of claim 1 wherein: the stainless steel support layer has an opening therein; and the conductive adhesive extends between the copper layer and the microactuator motor through the opening in the stainless steel support layer.

3. The dual stage actuated suspension of claim 2 wherein the conductive adhesive directly physically and electrically bonds the microactuator motor both to the protective layer on the stainless steel and to the copper layer.

4. The dual stage actuated suspension of claim 2 wherein the copper layer has a protective layer thereon, and the conductive adhesive is bonded to the copper layer through the protective layer thereon.

5. The dual stage actuated suspension of claim 1 wherein:
   the protective layer on the stainless steel comprises nickel and gold; and
   the insulative layer comprises polyimide.

6. The electrical interconnect of claim 2 wherein the opening in the stainless steel comprises a via.

7. The dual stage actuated suspension of claim 1 wherein the conductive adhesive is less than 5 μm thick.

8. The dual stage actuated suspension of claim 1 wherein the conductive adhesive is less than 5 μm thick between the microactuator motor and the stainless steel.

9. The dual stage actuated suspension of claim 1 wherein the conductive adhesive extends through a via in the stainless steel and does not extend through a via in the insulative layer.

10. The dual stage actuated suspension of claim 2 wherein the stainless steel through which the opening extends is electrically isolated from ground.

11. The dual stage actuated suspension of claim 1 wherein a vertical line extending through the electrical interconnect contact pad extends through the copper, the stainless steel, the conductive adhesive, and the microactuator motor in that order without extending through the insulative layer.

12. The dual stage actuated suspension of claim 11 wherein the vertical line further extends through a layer of gold between the stainless steel and the conductive adhesive.

13. A dual stage actuated suspension having an electrical interconnect contact pad bonded to a microactuator motor, the electrical interconnect contact pad and its bonding comprising:
   a stainless steel support layer on a bottom side of the electrical interconnect;
   an insulative layer on the stainless steel support layer;
   a conductive layer on a top side of the electrical interconnect, the conductive layer being disposed partly directly on the insulative layer and partly directly on the stainless steel support layer;
   a microactuator motor located on the bottom side of the electrical interconnect contact pad;
   conductive adhesive electrically and physically bonding the microactuator motor to the stainless steel support layer.

14. The electrical interconnect of claim 13 wherein the stainless steel support layer is isolated from ground, and the conductive layer carries a microactuator motor driving voltage.

15. The electrical interconnect of claim 13 wherein the stainless steel support layer is grounded.

16. The electrical interconnect of claim 13 wherein the conductive adhesive electrically and physically bonds the microactuator to both the stainless steel support layer and to the conductive layer without extending through an opening in the insulative layer.

17. The electrical interconnect of claim 13 wherein where the adhesive layer contacts the conductive layer, a bottom surface of the conductive layer is coplanar with a top surface of the stainless steel layer.

18. A dual stage actuated suspension having an electrical interconnect contact pad bonded to a microactuator motor, the electrical interconnect contact pad and its bonding comprising:
- a support layer on a bottom side of the electrical interconnect and facing downward toward the microactuator;
- an insulative layer on the support layer, the insulative layer having a via through a portion thereof;
- a copper layer that both covers a portion of the insulative layer and also extends through the via in the insulative layer;
- conductive adhesive electrically connecting copper in the via to a microactuator motor without the support layer between the conductive adhesive and the copper.

19. The dual stage actuated suspension of claim 18 wherein:
- the support layer comprises stainless steel;
- the support layer has a via formed therein; and
- the conductive adhesive is disposed within the via through the support layer, such that the conductive adhesive and the copper collectively extend through said via in the insulative layer and through said via in the support layer to meet at a vertical level that is a same vertical level at which the support layer and the insulative layer meet outside of said vias.

20. The dual stage actuated suspension of claim 19 wherein the via through the support layer is narrower than the via through the insulative layer, and in an area of the via through the support layer horizontally spaced apart from the via through the support layer, some of the copper layer is deposited on the support layer without any insulative material therebetween.

* * * * *

UNITED STATES PATENT AND TRADEMARK OFFICE
CERTIFICATE OF CORRECTION

PATENT NO.        : 8,810,972 B1                                           Page 1 of 1
APPLICATION NO.   : 14/102123
DATED             : August 19, 2014
INVENTOR(S)       : Christopher G. Dunn It is certified that error appears in the above-identified patent and that said Letters Patent is hereby corrected as shown below:

In the Claims
Claim 16, column 8, line 61, after "microactuator" insert -- motor --.
Claim 17, column 8, line 65, after "conductive layer," insert -- and --.
Claim 18, column 9, line 6, after "microactuator" insert -- motor --.
Claim 18, column 9, line 11, after "layer;" insert -- and --.
Claim 18, column 9, line 13, after "to" delete "a" insert -- the --.
Claim 20, column 9, line 30, after "support layer," insert -- and --.

Signed and Sealed this
Thirtieth Day of December, 2014

Michelle K. Lee
*Deputy Director of the United States Patent and Trademark Office*